(No Model.)
W. D. SHERWOOD.
COVER FOR JARS.
No. 300,906. Patented June 24, 1884.
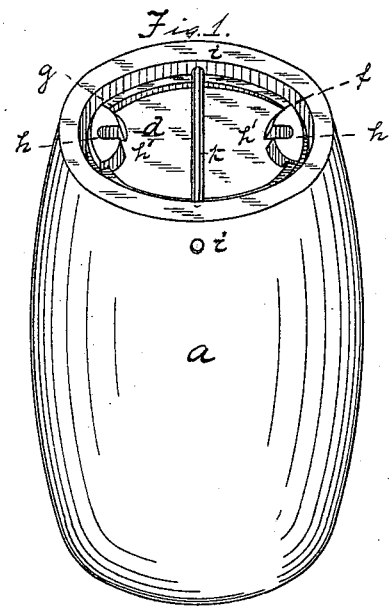
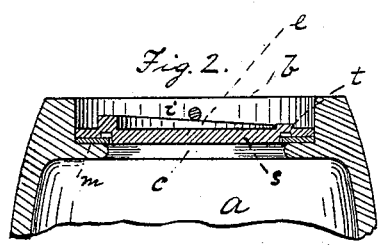
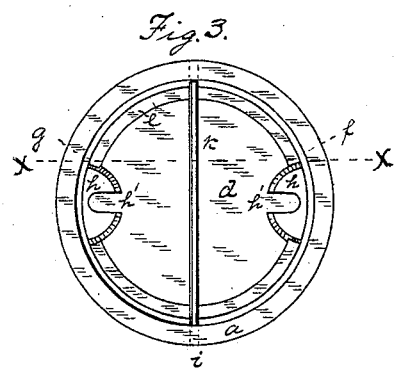
Witnesses
Jno. K. Smith
W. B. Corwin
Inventor
William D. Sherwood
by his attorneys
Bakewell & Kerr

UNITED STATES PATENT OFFICE.

WILLIAM D. SHERWOOD, OF NEW BRIGHTON, PENNSYLVANIA, ASSIGNOR TO SHERWOOD BROTHERS, OF SAME PLACE.

COVER FOR JARS.

SPECIFICATION forming part of Letters Patent No. 300,906, dated June 24, 1884.

Application filed January 16, 1884. (No model.)

*To all whom it may concern:*

Be it known that I, WILLIAM D. SHERWOOD, of New Brighton, in the county of Beaver and State of Pennsylvania, have invented a new and useful Improvement in Covers for Jars; and I do hereby declare the following to be a full, clear, and exact description thereof, reference being had to the accompanying drawings, making part of this specification, in which—

Figure 1 is a perspective view of the lid and the jar. Fig. 2 is a vertical sectional view of the same, and Fig. 3 is a plan view of the same.

Like letters of reference indicate like parts wherever they occur.

My invention relates to an improvement in covers for jars, and it is specially adapted for the purpose of forming a secure and simple cover for fruit and other jars where a tight joint which is easily loosened is required.

Although I do not desire to limit the application of my invention to any kind or form of jars, it is especially adapted to jars formed of earthenware. I have therefore shown this kind of jar in the drawings, and will hereinafter describe my invention as so applied, from which description it will be readily seen how to apply it to other jars formed of different shape and material.

I will now describe my invention, so that others skilled in the art to which it appertains may employ the same.

In the drawings, $a$ represents the jar—such as are generally formed of earthenware for containing preserves, butter, pickles, vinegar, and other similar articles—having a rim, $b$, around the top and a circular opening or mouth in the upper end, and on the edge of which opening is an annular step or offset, $c$, for the reception of the lid or cover. The lid $d$, which fits in the opening, is provided with an annular laterally-extending rim at its circumference, which rests on the annular step $c$. On the upper face of the lid is a vertical annular projecting rib, $e$, which is inclined on its upper surface, so as to form two separate inclines, one of which starts at the point $f$ and extends to the point $g$, and the other, commencing at or near the point $g$, extends to or near to the point $f$, each incline forming half of the annulus. At the points $g$ and $f$ on the upper face of the lid are the projecting lugs $h$, in which are suitable slots, $h'$, for the reception of a wrench. In the rim $b$, at points opposite each other, are the holes $i$, which engage and hold the ends of the rod or bolt $k$. This rod $k$, I prefer to form of stiff iron, steel, or copper wire having a certain amount of elastic resisting force. Between the lid $d$ and the opening in the jar resting on the step $g$ is a gasket, $m$, preferably formed of rubber, which, when the lid is placed on the jar, surrounds the central projecting portion, $s$, of the bottom of the lid, and is held in place by the edge of the annular recess or groove $t$. I prefer to use a lid of glass, as they are easily formed of a regular and even size in a mold adapted to the purpose.

These devices form a tight and secure lid or cover, which is easily and rapidly secured or loosened as follows: When it is desired to seal or close the opening in the top of the lid, the gasket $m$ is first placed in the annular step $c$. The lid $d$ is then placed in the opening, the rim $m$ and groove $t$ resting on and over the gasket, the lid being in such position that the beginning or lower portion of the inclined ribs $e$ are in a line with the holes or slots $i$. The rod or wire $k$ is then passed through the holes $i$, so that it shall extend from one opening to the other over the lid $d$. By turning the lid on its center the higher portions of the inclines come in contact with the rod or wire $k$, and owing to the resistance of the rod the cover or lid is pressed tightly down on the gasket, the edge of which enters the groove $t$, forming a tight and secure joint between the cover and the lid. Owing to the elasticity of the rod $k$, the lid is prevented from becoming jammed, and a more perfect and secure joint is attained.

I am aware that fruit-jar lids having inclined ribs formed thereon engaging with lugs or inclines on the jar are not new; also, that clamps engaging with the lower and outer face of the neck of the jar have been used in connection with a lid having an incline or inclines formed thereon.

I am also aware that a bar engaging with an annular recess in the inner face of the neck of the jar has been employed in a like manner, and I do not desire to claim the same; but,

Having thus described my invention, what I claim, and desire to secure by Letters Patent, is—

1. The combination of the lid $d$, having an inclined rib or ribs, $e$, a jar, $a$, having a rim, $b$, and slots $i$, and a wire or bar, $k$, adapted to engage with the slots $i$ and rib $e$, substantially as and for the purpose specified.

2. An earthenware jar having a rim, $b$, in which are formed slots $i$, in combination with a lid, $d$, having an inclined rib or ribs, $e$, and an elastic wire or bar, $k$, adapted to engage with the slots $i$ and rib $e$, substantially as and for the purpose specified.

In testimony whereof I have hereunto set my hand this 10th day of January, A. D. 1884.

WILLIAM D. SHERWOOD.

Witnesses:
   W. B. CORWIN,
   JAMES K. BAKEWELL.